(12) United States Patent
Watanabe et al.

(10) Patent No.: US 6,980,717 B2
(45) Date of Patent: Dec. 27, 2005

(54) OPTICAL FIBER COLLIMATOR

(75) Inventors: Yasuyuki Watanabe, Tokyo (JP); Satoshi Taniguchi, Tokyo (JP); Minoru Taniyama, Tokyo (JP); Takeshi Morita, Tokyo (JP); Hiroshi Koshi, Tokyo (JP)

(73) Assignee: Nippon Sheet Glass Company, Limited, (JP)

( * ) Notice: Subject to any disclaimer, the term of this patent is extended or adjusted under 35 U.S.C. 154(b) by 0 days.

(21) Appl. No.: 10/916,324

(22) Filed: Aug. 11, 2004

(65) Prior Publication Data

US 2005/0063643 A1 Mar. 24, 2005

(30) Foreign Application Priority Data

Aug. 21, 2003 (JP) .............................. 2003-208218

(51) Int. Cl.[7] .............................................. G02B 6/32
(52) U.S. Cl. .............................. 385/33; 385/34; 385/93
(58) Field of Search ........................ 385/33–37, 88–94; 359/642

(56) References Cited

U.S. PATENT DOCUMENTS

2004/0047557 A1 * 3/2004 Muto et al. .................... 385/33
2004/0047558 A1 * 3/2004 Yasuda et al. ................. 385/33

FOREIGN PATENT DOCUMENTS

| JP | 57-53702 | 3/1982 |
| JP | 2000-304966 | 11/2000 |
| JP | 2001-305376 | 10/2001 |

* cited by examiner

Primary Examiner—Phan T. H. Palmer
(74) Attorney, Agent, or Firm—Caesar, Rivise, Bernstein, Cohen & Pokotilow, Ltd.

(57) ABSTRACT

An optical fiber collimator including a microlens array and single mode optical fibers. Microlens elements are formed in two surfaces of the transparent substrate. Two opposing microlens elements each function as a collimator lens. The single mode optical fiber is optically coupled to the collimator lens.

25 Claims, 7 Drawing Sheets

D1 ≒ lens diameter D × 0.9 eg) lens diameter D = 250 μm

RMS = 0.045 λ (wavelength of measurement light λ = 633nm)

| t | Focal Length | NA |
|---|---|---|
| 0.4 | 0.3841 | 0.3254 |
| 0.5 | 0.4121 | 0.3033 |
| 0.6 | 0.4445 | 0.2812 |
| 0.7 | 0.4865 | 0.2261 |
| 0.8 | 0.5166 | 0.2129 |

OPTICAL FIBER COLLIMATOR

CROSS-REFERENCE TO RELATED APPLICATIONS

This application is based upon and claims priority from Japanese Patent Application No. 2003-208218 filed on Aug. 21, 2003, which is herein incorporated in its entirety by reference.

BACKGROUND OF THE INVENTION

The present invention relates to an optical fiber collimator including a microlens array having a plurality of microlens elements formed in the surface of a transparent substrate.

FIG. 12 shows an optical fiber collimator 20 of the prior art. The optical fiber collimator 20 includes a planar microlens array 21 and an optical fiber array 22, which includes a plurality of single mode optical fibers 22A. The planar microlens array 21 includes a plurality of semispherical, gradient index microlens elements 24, which are formed on one surface 23a of the glass substrate 23. The diameter of each microlens element is about several tens of micrometers to several hundreds of micrometers. Japanese Laid-Open Patent Publication No. 57-53702 describes manufacturing the planar microlens array 21 by performing ion exchange. A metal mask is first applied to one surface 23a of the glass substrate 23. Photolithography is then performed to pattern the metal mask and form a plurality of mask openings in the metal mask. The glass substrate 23 is then immersed in molten salt, which contains ions of elements having the effect of increasing the refractive index. Ion exchange reaction occurs between the molten salt and the glass of the glass substrate 23 exposed from the mask openings. This forms a plurality of gradient index regions, or the microlens elements 24, in the surface 23a of the glass substrate 23.

In the planar microlens array, the array accuracy of the microlens elements mainly depends on the formation accuracy of the mask openings in the metal mask. The formation accuracy is extremely high. Thus, the planar microlens array is widely used in the optical communication field, the OA equipment field, which includes copy machines and facsimile machines, and the medical field, which includes endoscopes.

Japanese Laid-Open Patent Publication No. 2001-305376 describes an optical cross connect module, which is a combination of an optical switch array and an optical fiber array. The optical cross connect module is used in the optical communication field to switch the transfer designation of a plurality of optical signals. The optical cross connect module normally includes an optical fiber collimator. The optical fiber collimator is manufactured by optically coupling the planar microlens array and the optical fiber array. Accordingly, the planar microlens array is an important optical element of the optical fiber collimator.

Japanese Laid-Open Patent Publication No. 2000-304966 describes a planar microlens formed by adhering a plurality of glass substrates to each other.

In the prior art optical fiber collimator 20 of FIG. 12, the microlens elements 24 are formed in only one surface 23a of the glass substrate 23. This optical fiber collimator 20 has the problem described below.

It is difficult to manufacture the planar microlens array 21 with the microlens elements 24 having a sufficient numerical aperture (NA). For example, when forming an optical fiber collimator array for collimating the light emitted from the single mode optical fibers, if the planar microlens array 21 includes microlens elements 24 having a low numerical aperture, the insertion loss is large in comparison to when using lenses having a relatively high numerical aperture, such as gradient index rod lenses. Thus, it becomes difficult to obtain low insertion loss as is normally required in optical communication applications. When using microlens elements 24 having a low numerical aperture, in the emission light of a single mode optical fiber, only the light in a relatively narrow angular range can be used effectively. Further, the employment of the peripheral portion of a lens, where the aberration is unsatisfactory, is not preferable since this would decrease the light transmission accuracy.

SUMMARY OF THE INVENTION

One aspect of the present invention is an optical fiber collimator provided with a transparent substrate including a first surface and a second surface. A first microlens element is formed in the first surface. A second microlens element is formed in the second surface opposing the first microlens element. The second microlens element cooperates with the first microlens element to function as a single lens. A single mode optical fiber faces towards either one of the first and second surfaces.

Another aspect of the present invention is an optical fiber collimator provided with a transparent substrate including a first surface and a second surface. A plurality of first microlens elements are formed in the first surface. A plurality of second microlens elements are formed in the second surface, each opposing an associated one of the first microlens elements. The second microlens elements cooperate with the associated first microlens elements to function as a plurality of collimator lenses. The optical fiber collimator also includes a plurality of single mode optical fibers, each facing towards either one of the first and second surfaces and optically coupled to an associated one of the collimator lenses.

A further aspect of the present invention is a method for manufacturing an optical fiber collimator. The method includes preparing a transparent substrate having a first refractive index and including a first surface, a second surface, a plurality of first recesses formed in the first surface, and a plurality of second recesses, each formed in the second surface in association with one of the first recesses. The method also includes forming a plurality of first microlens elements by filling the first recesses with resin having a second refractive index that is greater than the first refractive index, and forming a plurality of second microlens elements by filling the second recesses with resin having the second refractive index. The second microlens elements cooperate with the associated first microlens elements to function as a plurality of collimator lenses. The method further includes optically coupling each of a plurality of single mode optical fibers to an associated one of the collimator lenses.

A further aspect of the present invention is a method for manufacturing an optical fiber collimator. The method includes preparing a transparent substrate including a first surface and a second surface. The method also includes defining a plurality of first area in the first surface, defining a plurality of second area in the second surface, exchanging ions of the first and second areas with ions in a molten salt to simultaneously form a plurality of first microlens elements and a plurality of first microlens elements in the first and second areas, respectively. The second microlens elements cooperate with the associated first microlens elements to function as a plurality of collimator lenses. The method further includes optically coupling each of a plurality of single mode optical fibers to an associated one of the collimator lenses.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
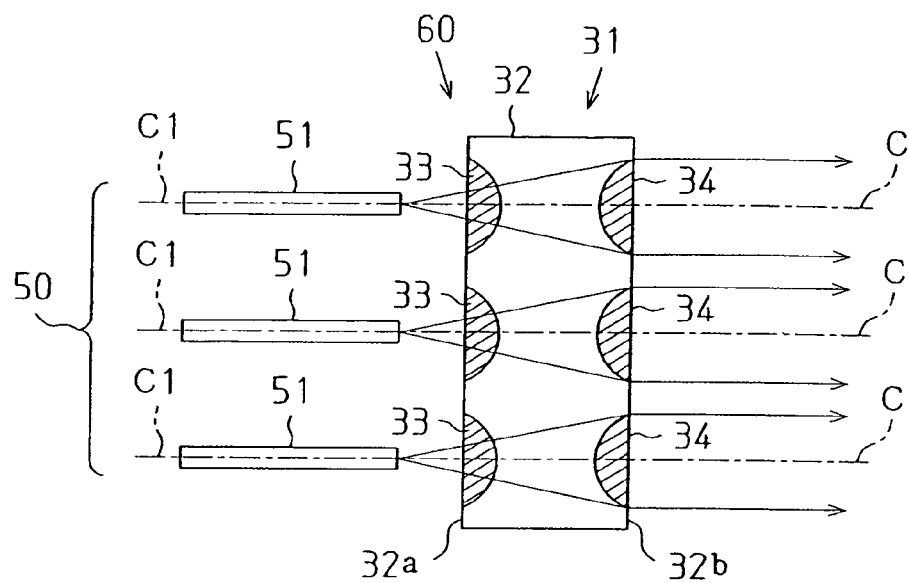
FIG. 1 is a plan view showing an optical fiber collimator according to a first embodiment of the present invention.

Optical fiber collimators according to preferred embodiments of the present invention will now be discussed with reference to the drawings. In the drawings, like numerals are used for like elements throughout. A first embodiment of the present invention will now be described with reference to FIGS. 1 to 5.

Figure 2:
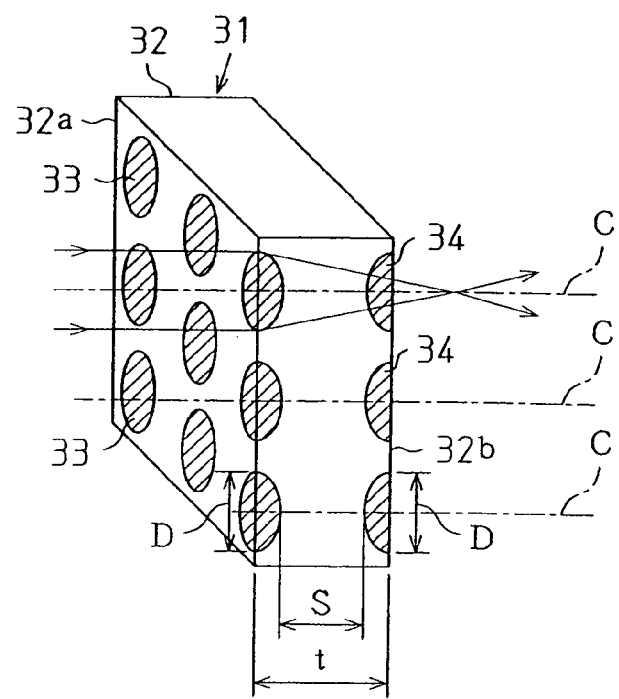
FIG. 2 is a perspective view showing a planar microlens array of FIG. 1.
Figure 3:
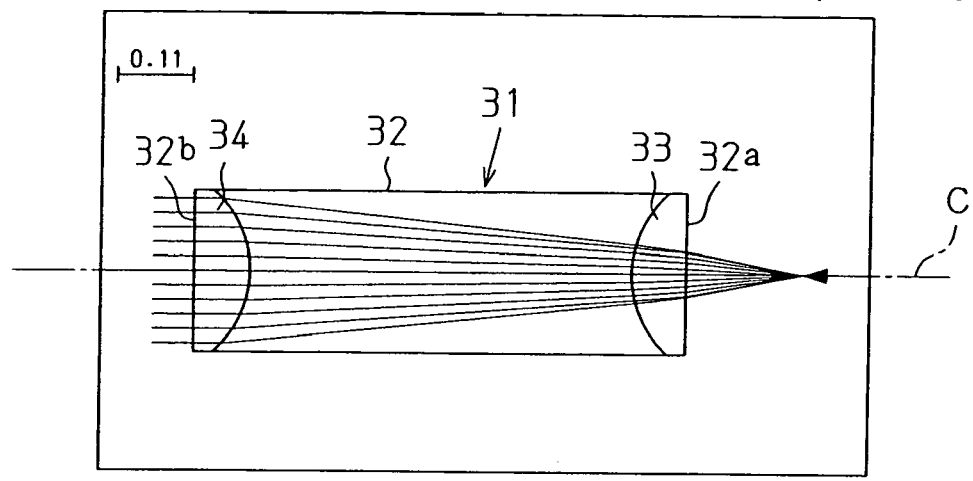
FIG. 3 is a side view showing an example of the microlens array of FIG. 1.

FIG. 1 show an optical fiber collimator 60 according to the first embodiment. FIG. 2 shows a planar microlens array 31 used in the optical fiber collimator 60, and FIG. 3 shows two of a plurality of opposing microlens elements 33 and 34.

Referring to FIG. 1, the optical fiber collimator 60 includes the planar microlens array 31 and the optical fiber array 50.

Referring to FIGS. 1 and 2, the planar microlens array 31 includes a transparent glass substrate 32. The glass substrate 32 includes a first surface 32a and a second surface 32b, which are parallel to each other. A plurality of microlens elements 33 and 34 are formed in the surfaces 32a and 32b, respectively.

The first surface 32a of the glass substrate 32 includes, for example, nine first microlens elements 33 arranged in a matrix (in three rows and three columns). The second surface 32b includes nine second microlens elements 34, the quantity of which is the same as the first microlens elements 33, arranged in a matrix.

Each of the first microlens elements 33 cooperates with an opposing one of the second microlens elements 34 to function as a single lens (collimator lens). Each microlens element 33 has a lens diameter D (refer to FIG. 2) that is equal to that of the associated microlens element 34. Further, each microlens element 33 includes an optical axis C that is aligned with that of the associated microlens element 34. The optical axes C of the collimator lenses are parallel to one another.

Each of the microlens elements 33 and 34 is a generally semispherical gradient index (GRIN) microlens element. Further, each of the microlens elements 33 and 34 has a flat end face that is polished to be flush with the corresponding surface of the glass substrate 32 (first surface 32a or second surface 32b). Further, the gradient index region of each of the microlens elements 33 and 34, which is indicated by hatching in FIGS. 1 and 2, functions as a positive lens. The planar microlens array 31 has a flat surface and is manufactured by performing ion exchange.

As shown in FIG. 1, the optical fiber array 50, which is arranged on one side of the planar microlens array 31, includes a plurality of single mode optical fibers 51, which are optically coupled to an associated one of the collimator lenses. The quantity of the optical fibers 51 is the same as that of the microlens elements 33. Each single mode optical fiber 51 has a core axis C1, which is aligned with the optical axis of the associated collimator lens, that is, the optical axis C of the associated set of the microlens elements 33 and 34.

EXAMPLE

FIG. 3 shows an example of the planar microlens array 31 shown in FIGS. 1 and 2. The parameters of the planar microlens array 31 in this example are as listed below.

Lens thickness t (thickness of glass substrate 32) 0.7 mm
Lens diameter D 250 μm
Focal length f 0.4865 mm
Numerical aperture 0.2261 (measurement wavelength 1.55 μm)

The focal length f changes when the lens thickness t changes. Accordingly, the numerical aperture also changes. For example, when the lens thickness t is 0.8 mm, the focal length f is 0.5166 mm and the numerical aperture NA is 0.2129.

Comparative Example

Figure 12:
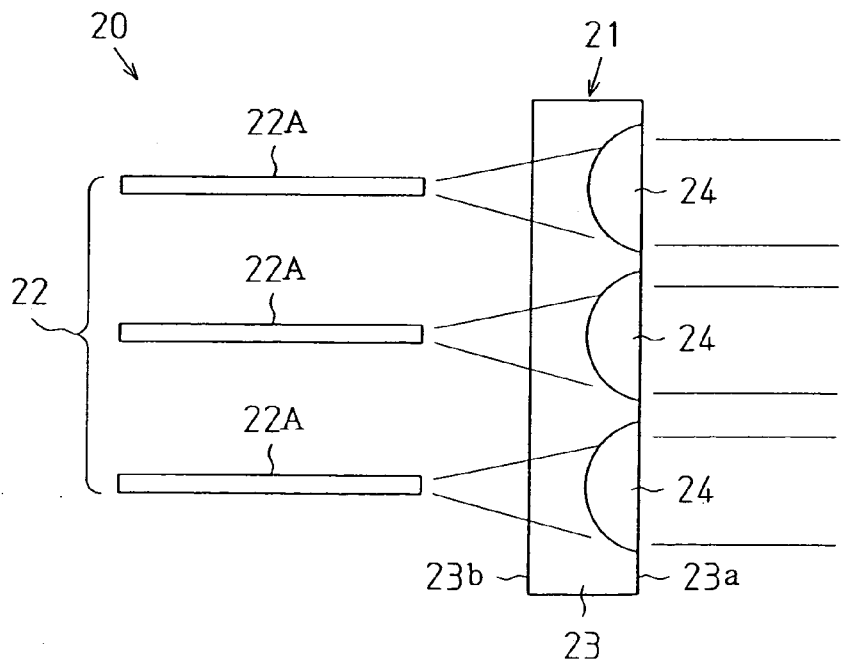
FIG. 12 is a plan view showing an optical fiber collimator of the prior art.
Figure 13:
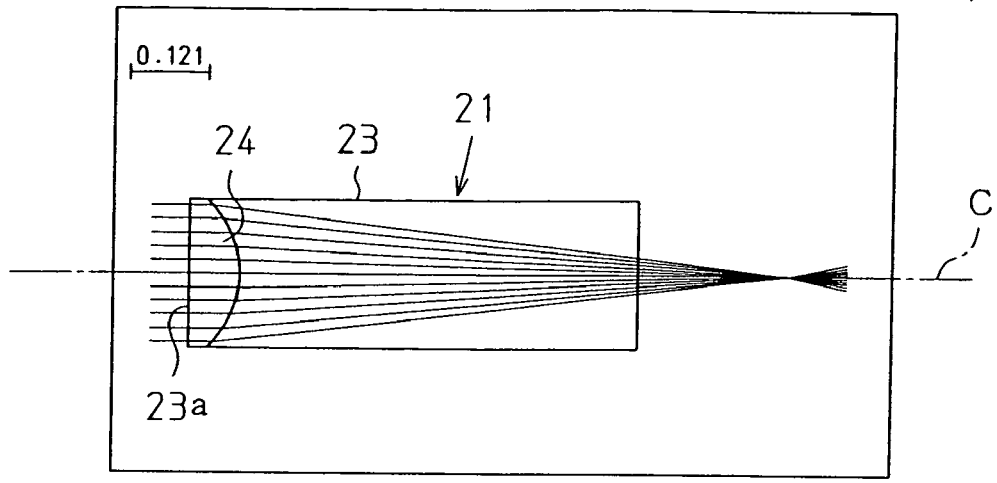
FIG. 13 is a side view showing a planar microlens array of a comparative example.

FIG. 13 shows a comparative example of the prior art planar microlens array 21 shown in FIG. 12. The parameters of the planar microlens array in this comparative example are as listed below.

Lens thickness t (thickness of glass substrate 32) 0.7 mm
Lens diameter D 250 μm
Focal length f 0.7383 mm
Numerical aperture 0.149 (measurement wavelength 1.55 μm)

When comparing the example and the comparative example that have the same lens thickness t and the same lens diameter C, it is apparent that the numerical aperture NA of the example is greater than that of the comparative example.

Figure 4:
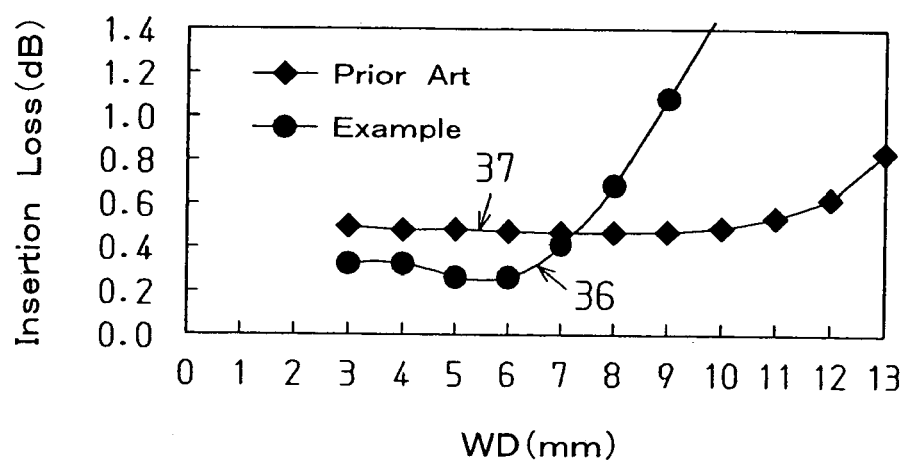
FIG. 4 is a graph showing the relationship between the working distance (WD) and the insertion loss in the optical fiber collimator of FIG. 1.

FIG. 4 is a graph showing the relationship between the working distance WD (mm) and the insertion loss (dB) of the planar microlens array of the example and the comparative in the optical fiber collimator arranged as shown in FIG. 1. In FIG. 4, curve 36 indicates the characteristics of the example, and curve 37 indicates the characteristics of the prior art example. In a collimator optical system arranged so that two optical fiber collimators are opposed to each other, the working distance WD refers to the distance in which collimator light can be coupled between the two optical fiber collimators (collimator length).

From FIG. 4, it is apparent that when the working length WD is approximately 7 mm or less, the insertion loss of the example indicated by curve 36 is approximately 0.2 dB less than the insertion loss of the prior art example indicated by curve 37. This is because the planar microlens array 31 of the example shown in FIG. 3, which includes the microlens elements 33 and 34 formed on two surfaces of the glass substrate 32, has a numerical aperture NA that is greater than that of the planar microlens array 21 of the comparative example shown in FIG. 13, which includes the microlens elements 24 formed on only one surface 23a.

More specifically, in an optical fiber collimator using the planar microlens element 24 of the comparative example having a numerical aperture of which numerical aperture is less than that of the example, when collimating the light emitted from a single mode optical fiber, the effective range of the emission light is narrow. To widen the effective range, the peripheral portion of the microlens element must be used. However, the aberration is unsatisfactory at the peripheral portion. As a result, in the optical fiber collimator of the prior art example, the insertion loss becomes greater than the optical fiber collimator 60 that uses the planar microlens array 31 of the example in which the numerical aperture NA is greater. Thus, it becomes difficult to obtain low insertion loss as is required for normal optical communication applications.

In comparison, the numerical aperture NA in the planar microlens array 31 of the example is greater than the numerical aperture NA of the comparative example. Thus, in each of the microlens elements 33 and 34, sufficient numerical aperture NA is ensured around the lens center in which the aberration characteristics are satisfactory. This increases the effective numerical aperture of the planar microlens array 31. Thus, in the optical fiber collimator 60 formed by the planar microlens array 31 having an increased numerical aperture, the insertion loss is improved and low insertion loss as is required in normal optical communication applications is obtained.

Figure 5:
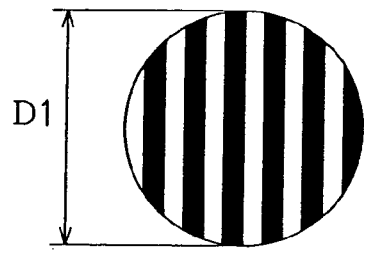
FIG. 5 is a diagram showing the interference fringe of the planar microlens array of FIG. 3.

FIG. 5 is a diagram showing the interference fringe of the planar microlens array of FIG. 3. The circle shown in FIG. 5 has an outer diameter D1, which is approximately 90% of the lens diameter D (refer to FIG. 2) (D1≈D×0.9). A Mach-Zehnder interferometer was used to measure the RMS value, which represents the wavefront aberration. The measurement result was 0.045 λ (the measured wavelength λ was 633 nm). From FIG. 5, in the optical fiber collimator 60 using the planar microlens array of the example shown in FIG. 3, it is apparent that a satisfactory result was obtained in which the aberration was small not only at the lens center of the microlens element 33 and 34 but also at the peripheral portions of the microlens elements 33 and 34.

The first embodiment has the advantages described below.

The two surfaces of the glass substrate (first surface 32a and second surface 32b) respectively include the plurality of microlens elements 33 and 34. Thus, the numerical aperture NA is greater than the prior art planar microlens array 21 (FIG. 12), in which the microlens elements 24 are formed on only one surface of the glass substrate 23. For example, the numerical aperture NA of the prior art planar microlens array 21 shown in FIG. 12 is approximately 0.15 to 0.17 and relatively small. In the comparative example shown in FIG. 13, the numerical aperture NA is 0.149. In comparison, the numerical aperture NA of the planar microlens array 31 used by the optical fiber collimator 60 of the first embodiment is approximately 0.22 or greater and relatively large. In the example of FIG. 3, the numerical aperture NA is 0.2261. In each of the microlens elements 33 and 34, this obtains the sufficient numerical aperture NA near the lens center at which the aberration characteristics are satisfactory. Thus, the planar microlens array 31 increases the effective numerical aperture and decreases the insertion loss.

Since the effective numerical aperture of the planar microlens array 31 is increased, the optical fiber collimator 60 has low insertion loss as required for normal optical communication applications.

The reduction of the insertion loss improves the light transmission efficiency of the optical fiber collimator 60.

When manufacturing the prior art planar microlens array 21 of FIG. 12, for the reasons described above, it is difficult to obtain low insertion loss as required in normal optical communication applications. Further, it is difficult to change the lens specification, such as the numerical aperture NA and the focal length. In the planar microlens array 31 used for the optical fiber collimator 60 of the first embodiment, two opposing microlens elements 33 and 34 have the same lens diameter and the same optical axis C. Thus, the distance S between the two opposing microlens elements 33 and 34 may be changed to adjust the focal length f of each lens in the planar microlens array 31. To change the lens distance S, the thickness of the glass substrate 32 (lens thickness t) or the lens diameter D of the microlens elements 33 and 34 may be changed. By changing the lens distance S, various types of optical fiber collimators 60 having different optical characteristics may easily be manufactured.

For example, referring to FIG. 3, by changing the lens thickness t of the glass substrate 32 from 0.7 mm to 0.8 mm, the focal length f increases from 0.4865 mm to 0.5166 mm (refer to FIG. 1). Although this change decreases the numerical aperture NA from 0.2261 to 0.2129, the decrease is small and does not have any significant influence.

Figure 11:
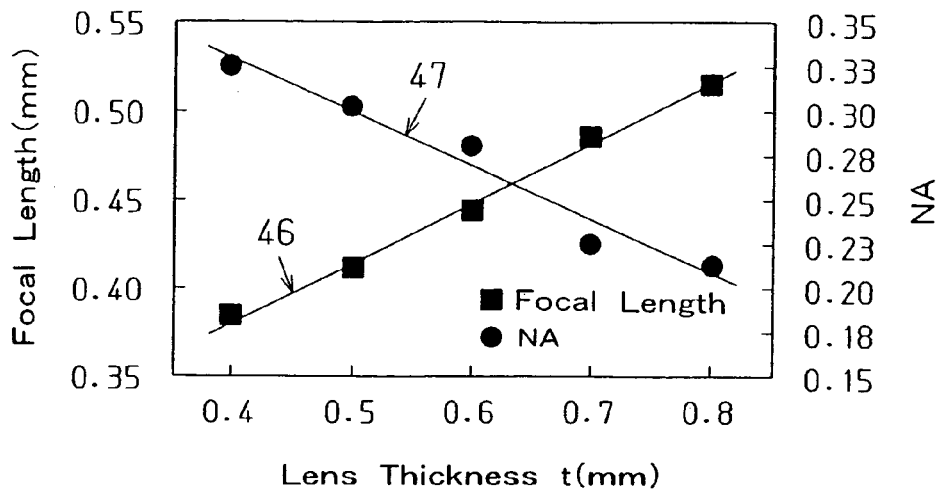
FIG. 11 is a graph showing the relationship between the lens thickness t, the numerical aperture NA, and the focal length f.

FIG. 11 shows the correlation between the lens thickness t, the numerical aperture NA, and the focal length f for the planar microlens array 31 in which the lens diameter D of the two opposing microlens elements 33 and 34 is 250 μm. It is apparent from FIG. 11 that when the lens thickness t changes from 0.4 mm to 0.8 mm, the focal length f increases in a linear manner from 0.3841 to 0.5166 mm as shown by line 46. When the lens thickness t changes from 0.4 mm to 0.8 mm, the numerical aperture NA decreases in a linear manner from 0.3254 to 0.2129 as shown by line 47.

The planar microlens array 31, which includes the plurality of generally semispherical gradient index microlens elements 33 and 34 formed on the two surfaces of the glass substrate 32 (first surface 32a and second surface 32b), may easily be manufactured by performing ion exchange. For example, masks having openings are formed on the first surface 32a and the second surface 32b to define first and second areas in the first and second surfaces 32a and 32b, respectively. The glass substrate 32 is immersed in molten salt to cause ion exchange reaction the molten salt and the glass of the first and second areas exposed from the mask openings. This simultaneously forms the microlens elements 33 and 34 in the surfaces 32a and 32b. When manufacturing the planar microlens array 31 in such a manner, the array accuracy of the microlens elements 33 and 34 depends on the accuracy of forming photomask. Thus, the planar microlens array 31 is manufactured with high lens array accuracy. Accordingly, the planar microlens array 31 is easy to manufacture and has a high optical characteristic. Further, the optical fiber collimator 60 transfers light with higher efficiency.

An optical fiber collimator 70 according to a second embodiment of the present invention will now be discussed with reference to FIGS. 6 and 7.

The optical fiber collimator 70 includes a planar microlens array 31, which is similar to that of the optical fiber collimator 60 shown in FIG. 1. However, the optical fiber collimator 70 differs from the optical fiber collimator 60 in that the core axis C1 of each single mode optical fiber 51 of an optical fiber array 50 is inclined relative to the optical axis C of the associated set of two microlens elements 33 and 34. In FIG. 6, among the plurality of single mode optical fibers 51 included in the optical fiber array 50, only one single mode optical fiber 51 is shown.

Figure 14:
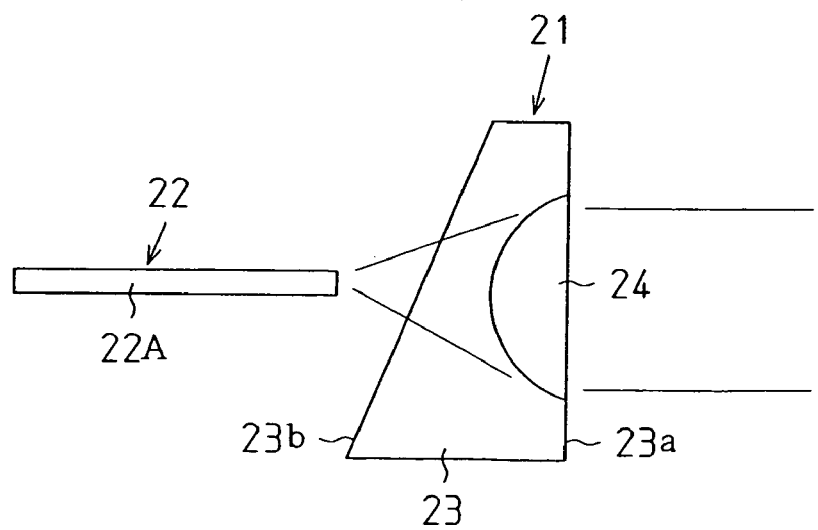
FIG. 14 is a side view showing a prior art optical fiber collimator that prevents reflection return light.

In the prior art planar microlens array 21 shown in FIG. 12, the plurality of microlens elements 24 are formed in one surface 23a of the glass substrate 23. Thus, the other surface may be polished to form an inclined surface 23b as shown in FIG. 14. The inclined surface 23b prevents the light reflected by the planar microlens array 21 from returning to a single mode optical fiber 22A.

In comparison, in the optical fiber collimator 60 shown in FIG. 1, the microlens elements 33 and 34 are formed on the two surfaces of the glass substrate 32. Thus, the problem of the reflection return light cannot be coped with in the same manner as in the prior art example of FIG. 12. Thus, in the second embodiment, the planar microlens array 31 is inclined relative to the optical fibers 51 to cope with reflection return light.

Figure 6:
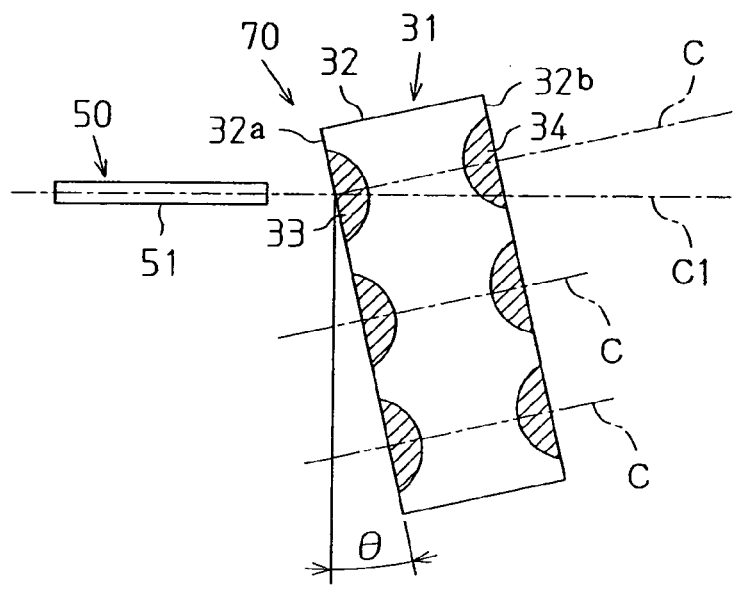
FIG. 6 is a plan view showing an optical fiber collimator according to a second embodiment of the present invention.

The optical fiber collimator 70 of FIG. 6 includes the optical fiber array 50 and the planar microlens array 31.

As shown in FIG. 6, the planar microlens array 31 has a first surface 32a, which is inclined by an inclination angle θ relative to the emission light of each single mode optical fiber 51. This prevents the light reflected by the first surface 32a and second surface 32b of the planar microlens array 31 from returning to the single mode optical fibers 51. The inclination angle θ is the angle formed between a plane perpendicular to the core axis C1 of each single mode optical fiber 51 and the first surface 32a of the planar microlens array 31.

Figure 7:
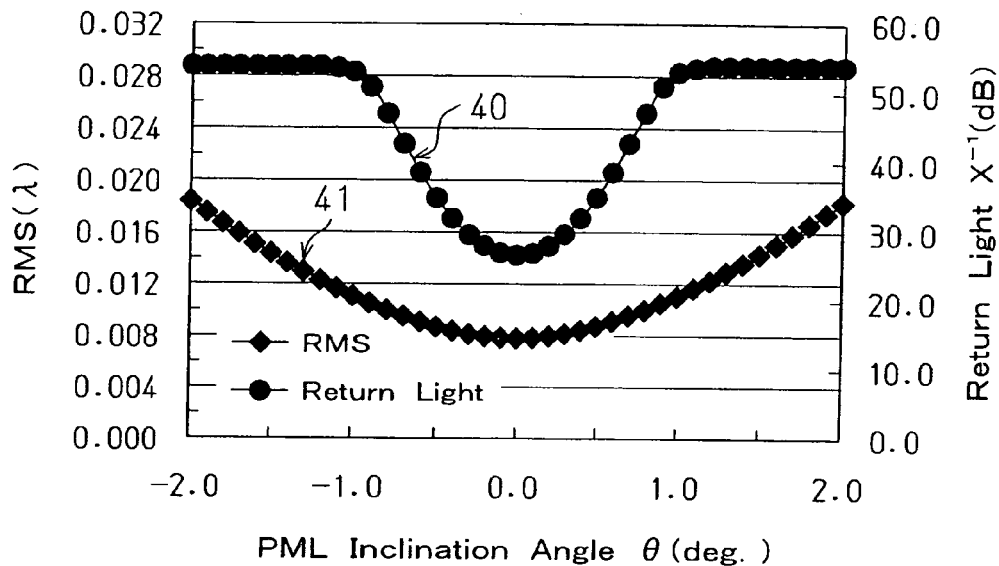
FIG. 7 is a graph showing the relationship between the inclination angle θ, RMS, and reflection return light of the planar microlens array in the optical fiber collimator of FIG. 6.

FIG. 7 shows the change in the RMS value, which represents the spherical aberration, and the change in the reflection return light when the inclination angle (PML inclination angle) θ of the planar microlens array 31 is changed. In FIG. 7, curve 40 indicates changes in the reflection return light, and curve 41 indicates changes in RMS (λ). The right axis of FIG. 7 indicates the inverse of reflective return light intensity X.

The second embodiment has the advantages described below.

It is apparent from FIG. 7 that the reflection return light is reduced to approximately 55 dB when the inclination angle θ is changed by ±1° from a state in which the core axis C1 of each optical fiber 51 is orthogonal to the substrate surface (first surface 32a) of the planar microlens array 31. Further, when the inclination angle θ is in the range of approximately +1.0° to −2.0°, the reflection light is substantially constant (55 dB) and there is substantially no reflection return light directed toward the single mode optical fibers 51. When the inclination angle θ is in the range of +2.0° to −2.0°, the RMS varies within the range of substantially 0.008λ to 0.018λ. Thus, the aberration of each microlens element 33 and 34 does not change much.

In this manner, by setting the inclination angle θ of the planar microlens array 31 in the optical fiber collimator 70 shown in FIG. 6 in the range of approximately +1.0° to +2.0° or −1.0 to −2.0°, reflection light is prevented from returning to the single mode optical fiber 51 without affecting the aberration of each microlens element 33 and 34 in an unsatisfactory manner.

A third embodiment of the present invention will now be discussed with reference to FIGS. 8 and 9.

Figure 8:
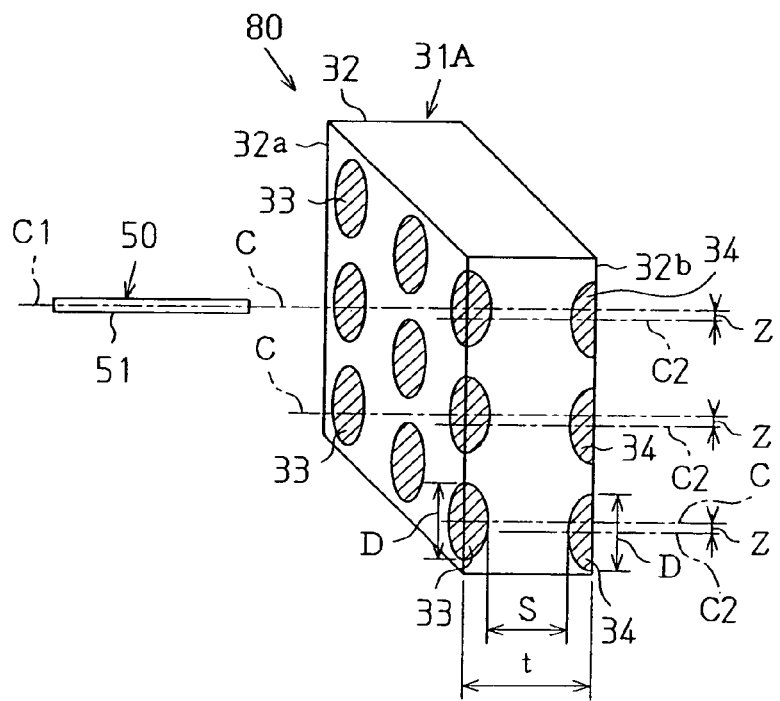
FIG. 8 is a perspective view showing an optical fiber collimator according to a third embodiment of the present invention.

Referring to FIG. 8, in the third embodiment, an optical fiber collimator 80 includes sets of two opposing microlens elements 33 and 34 having the same lens diameter D. The opposing microlens elements 33 and 34 respectively have optical axes C and C2 that are parallel to and deviated from each other. Among the two microlens elements 33 and 34, the core axis C1 of each single mode optical fiber 51 is aligned with the optical axis C of the microlens element 33, which is closer to the distal end of the optical fiber 51. Among the plurality of the single mode optical fibers 51 included on the optical fiber array 50, FIG. 8 shows only one single mode optical fiber 51.

Figure 9:
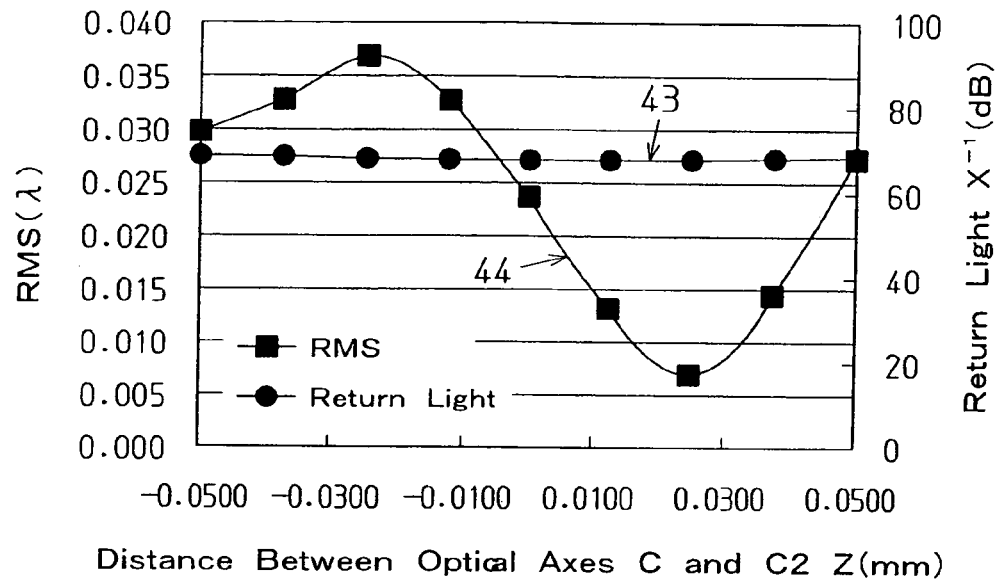
FIG. 9 is a graph showing the relationship between the reflection return light, the RMS, and distance between optical axes in the optical fiber collimator of FIG. 8.

FIG. 9 shows changes in the reflection return light and the RMS when the distance Z between the optical axes of the two opposing microlens elements 33 and 34 is changed within the range of +0.0500 mm to −0.0500 mm. In FIG. 9, curve 43 shows changes in the reflection return light, and curve 44 shows changes in the RMS.

The third embodiment has the advantages described below.

FIG. 9 shows that the reflection return light to each single mode optical fiber 51 is approximately 70 dB and constant when the offset Z changes in the range of +0.0500 mm to −0.0500 mm. This shows that there was almost no reflection return light. Further, when the offset Z is in the range of +0.0500 mm to −0.0500 mm, the RMS changes in the range of 0.007 λ to 0.037 λ. Thus, the aberration of each of the microlens elements 33 and 34 does not change much. Accordingly, reflection light is prevented from returning to the single mode optical fiber 51 without affecting the aberration of each microlens element 33 and 34 in an unsatisfactory manner. Therefore, the optical axis of each microlens element in the planar microlens array 31A does not have to be inclined relative to the core axis C1 of each single mode optical fiber 51. This facilitates the alignment of the single mode optical fibers and the planar microlens array 31A and simplifies the manufacturing of the optical fiber collimator 80.

Figure 10:
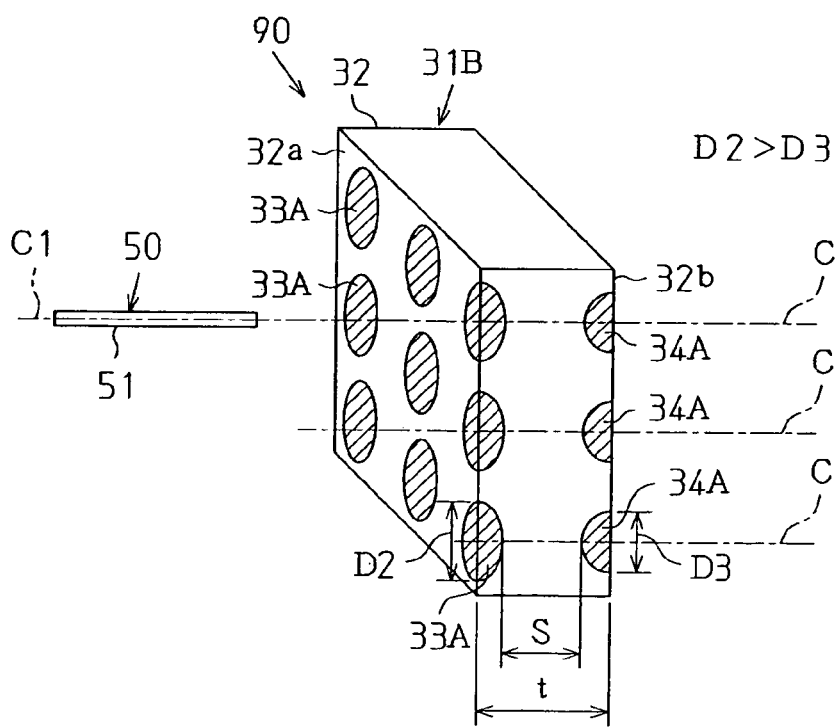
FIG. 10 is a perspective view showing an optical fiber collimator according to a fourth embodiment of the present invention.

An optical fiber collimator 90 according to a fourth embodiment of the present invention will now be discussed with reference to FIGS. 10 and 11. In the optical fiber collimator 90, each set of two opposing microlens elements 33A and 34A have the same optical axis C and different lens diameters D2 and D3. The remaining structure is the same as the optical fiber collimator 60 shown in FIG. 1. Among the plurality of single mode optical fibers 51, FIG. 10 shows only one of the single mode optical fibers 51.

Two opposing microlens elements 33A and 34A, which function as a single lens, have different lens diameters D2 and D3 and the same optical axis C. The combination of the lens diameters D2 and D3 are changed to vary the numerical aperture NA, with the focal length f kept fixed. In other words, the lens diameter D2 of each microlens element 33A in the first surface 32a and the lens diameter D3 of each microlens element 34A in the second surface 32b are changed to enable changes in the optical characteristics (specification changes of lens), such as the numerical aperture NA, while keeping the focal length f fixed in the planar microlens array 31B. This facilitates the manufacturing of various types of optical fiber collimators 90 having different optical characteristics.

It should be apparent to those skilled in the art that the present invention may be embodied in many other specific forms without departing from the spirit or scope of the invention. Particularly, it should be understood that the present invention may be embodied in the following forms.

A plurality of the microlens elements 33 and 34 or 33A and 34A are formed in the two surfaces of the glass substrate 32 in the planar microlens arrays 31, 31A, and 31B. However, the present invention is not limited to such a planar microlens array. For example, the present invention may be applied to a planar microlens in which only one microlens element is formed in each of the two surfaces of the glass substrate 32.

In the first embodiment, the optical fiber collimator 60 includes the planar microlens array 31 and the optical fiber array 50. The planar microlens array 31 includes microlens elements 33 and 34 formed in two surfaces of a single glass substrate 32. However, the present invention is not limited to such an optical fiber collimator. The present invention may also be applied to an optical fiber collimator that optically couples a flat microlens with the optical fiber array 50. The flat microlens may be formed by adhering two flat microlens plates, each having at least one microlens element formed in one of its surfaces, in the same manner as described in Japanese Laid-Open Patent Publication No. 2000-304966. The adhered type planar microlens is formed by holding a glass substrate between two planar microlenses and then integrating the two flat microlenses and the flat planar glass substrate. The second to fourth embodiments may be modified in the same manner.

In the first embodiment, the optical fiber collimator 60 uses a planar microlens array having a flat surface manufactured through ion exchange. However, the application of the present invention is not limited to such an optical fiber collimator 60. For example, the present invention may be applied to an optical fiber collimator including a microlens array formed by using the expansion of a mask opening subsequent to ion exchange. The second to fourth embodiments may be modified in the same manner.

The transparent substrate may be made of a transparent material. The present invention may be applied to an optical fiber collimator using a planar microlens array including microlens elements formed by filling recesses of a transparent substrate with resin having a refractive index that is greater than that of the transparent substrate.

The present invention is applied to an optical fiber collimator with a planar microlens array including at least one microlens element formed in each of the two surfaces of the transparent substrate. The material and shape of the transparent substrate in the planar microlens array, the shape, material, and quantity of each microlens element, the dimensions of the transparent substrate or each microlens element, and the values of the focal length f and the numerical aperture NA may be changed.

In the above embodiments, the microlens elements 33 and 34 are arranged in a matrix of three rows and three columns to form the planar microlens array 31. However, the microlens elements 33 and 34 may each be formed in a single column.

The inclination for coping with reflection return light as shown in FIG. 6 may be applied to the examples of FIGS. 8 and 10. This would effectively prevent reflection light from returning to the single mode optical fiber 51.

The present examples and embodiments are to be considered as illustrative and not restrictive, and the invention is not to be limited to the details given herein, but may be modified within the scope and equivalence of the appended claims.

What is claimed is:

1. An optical fiber collimator comprising:
   a transparent substrate for providing a first surface and a second surface;
   a first microlens element formed in the first surface;
   a second microlens element formed in the second surface opposing the first microlens element, the second microlens element cooperating with the first microlens element to function as a single lens; and
   a single mode optical fiber facing towards either one of the first and second surfaces.

2. The optical fiber collimator according to claim 1, wherein:
   the first microlens element and the second microlens element each include a lens diameter and an optical axis, and the single mode optical fiber includes a core axis;
   the lens diameter of the first microlens element is equal to the lens diameter of the second microlens element; and
   the optical axis of the first microlens element and the optical axis of the second microlens element is aligned with the core axis of the single mode optical fiber.

3. The optical fiber collimator according to claim 1, wherein:
   the first microlens element and the second microlens element each include a lens diameter and an optical axis, and the single mode optical fiber includes a core axis;
   the lens diameter of the first microlens element is equal to the lens diameter of the second microlens element; and
   the optical axis of the first microlens element is aligned with the optical axis of the second microlens element; and
   the core axis of the single mode optical fiber is inclined relative to the optical axes of the first and second microlens elements.

4. The optical fiber collimator according to claim 1, wherein:
   the first microlens element and the second microlens element each include a lens diameter and an optical axis, and the single mode optical fiber includes a distal end and a core axis;
   the lens diameter of the first microlens element is equal to the lens diameter of the second microlens element; and
   the optical axis of the first microlens element is parallel to and deviated from the optical axis of the second microlens element; and
   among the first and second microlens elements, the core axis of the single mode optical fiber is aligned with the optical axis of the microlens element that is located closer to the distal end of the single mode optical fiber.

5. The optical fiber collimator according to claim 1, wherein:

the first microlens element and the second microlens element each include a lens diameter and an optical axis, and the single mode optical fiber includes a core axis;

the lens diameter of the first microlens element differs from the lens diameter of the second microlens element; and the optical axis of the first microlens element and the optical axis of the second microlens element is aligned with the core axis of the single mode optical fiber.

6. The optical fiber collimator according to claim 1, wherein the first microlens element and the second microlens elements are semispherical gradient index microlens elements.

7. The optical fiber collimator according to claim 1, wherein the transparent substrate includes a first refractive index, the first surface and the second surface each include a spherical or aspherical recess, and the first and second microlens element are formed by filling the recesses with a resin having a second refractive index that is greater than the first refractive index.

8. The optical fiber collimator according to claim 1, wherein the first surface and the second surface are parallel to each other.

9. An optical fiber collimator comprising:
  a transparent substrate including a first surface and a second surface opposing to the first surface;
  a plurality of first microlens elements formed in the first surface;
  a plurality of second microlens elements formed in the second surface, each opposing an associated one of the first microlens elements, the second microlens elements cooperating with the associated first microlens elements to function as a plurality of collimator lenses; and
  a plurality of single mode optical fibers, each facing towards either one of the first and second surfaces and optically coupled to an associated one of the collimator lenses.

10. The optical fiber collimator according to claim 9, wherein:
  the first microlens elements and the second microlens elements each include a lens diameter and an optical axis, and the single mode optical fibers each include a core axis;
  the lens diameter of the first microlens elements is equal to the lens diameter of the second microlens elements; and
  the optical axis of each first microlens elements and the optical axis of the associated second microlens element is aligned with the core axis of the single mode optical fiber.

11. The optical fiber collimator according to claim 9, wherein:
  the first microlens elements and the second microlens elements each include a lens diameter and an optical axis, and the single mode optical fibers each include a core axis;
  the lens diameter of each first microlens element is equal to the lens diameter of the associated second microlens element; and
  the optical axis of each first microlens element is aligned with the optical axis of the associated second microlens element; and
  the core axis of the single mode optical fiber is inclined relative to the optical axes of the associated first and second microlens elements.

12. The optical fiber collimator according to claim 9, wherein:
  the first microlens element and the second microlens element each include a lens diameter and an optical axis, and the single mode optical fibers each include a distal end and a core axis;
  the lens diameter of each first microlens element is equal to the lens diameter of the associated second microlens element; and
  the optical axis of each first microlens element is parallel to and deviated from the optical axis of the associated second microlens element; and
  among the first and second microlens elements, the core axis of the single mode optical fiber is aligned with the optical axis of the microlens element that is located closer to the distal end of the single mode optical fiber.

13. The optical fiber collimator according to claim 9, wherein:
  the first microlens elements and the second microlens elements each include a lens diameter and an optical axis, and the single mode optical fibers each include a core axis;
  the lens diameter of each first microlens element differs from the lens diameter of the associated second microlens element; and
  the optical axis of each first microlens element and the optical axis of the associated second microlens element is aligned with the core axis of the associated single mode optical fiber.

14. The optical fiber collimator according to claim 9, wherein each first microlens element and each second microlens elements are semispherical gradient index microlens elements.

15. The optical fiber collimator according to claim 9, wherein the transparent substrate has a first refractive index, and the first surface and the second surface are parallel to each other, the first surface and the second surface each including a plurality of recesses, and the first and second microlens elements being formed by filling the recesses with resin having a second refractive index that is greater than the first refractive index.

16. A method for manufacturing an optical fiber collimator, the method comprising:
  preparing a transparent substrate having a first refractive index and including a first surface, a second surface, a plurality of first recesses formed in the first surface, and a plurality of second recesses, each formed in the second surface in association with one of the first recesses;
  forming a plurality of first microlens elements by filling the first recesses with resin having a second refractive index that is greater than the first refractive index;
  forming a plurality of second microlens elements by filling the second recesses with resin having the second refractive index, the second microlens elements cooperating with the associated first microlens elements to function as a plurality of collimator lenses; and
  optically coupling each of a plurality of single mode optical fibers to an associated one of the collimator lenses.

17. The method according to claim 16, wherein the first microlens elements and the second microlens elements each include a lens diameter and an optical axis, and the single mode optical fibers each include a core axis, said optically coupling each of a plurality of single mode optical fibers includes:

aligning the optical axis of each first microlens element and the optical axis of the associated second microlens element with the core axis of the associated single mode optical fiber.

18. The method according to claim 16, wherein the first microlens elements and the second microlens elements each include a lens diameter and an optical axis, said optically coupling each of a plurality of single mode optical fibers includes:
   inclining the core axis of each single mode optical fiber relative to the optical axes of the associated first and second microlens elements.

19. The method according to claim 16, wherein the first microlens elements and the second microlens elements each include a lens diameter and an optical axis, said optically coupling each of a plurality of single mode optical fibers includes:
   among the associated first and second microlens elements, aligning the core axis of each single mode optical fiber with the optical axis of the microlens element that is located closer to the distal end of the single mode optical fiber.

20. The method according to claim 16, wherein the first recesses each have a circular opening with a first diameter, and the second recesses each have a circular opening with a diameter that is the same as the first diameter.

21. The method according to claim 16, wherein the first recesses each have a circular opening with a first diameter, and the second recesses each have a circular opening with a second diameter that differs from the first diameter.

22. A method for manufacturing an optical fiber collimator, the method comprising:
   preparing a transparent substrate including a first surface and a second surface;
   defining a plurality of first area in the first surface with a mask;
   defining a plurality of second area in the second surface with a mask;
   exchanging ions of the first and second areas with ions in a molten salt to simultaneously form a plurality of first microlens elements and a plurality of first microlens elements in the first and second areas, respectively, the first microlens elements cooperating with the associated second microlens elements to function as a plurality of collimator lenses; and
   optically coupling each of a plurality of single mode optical fibers to an associated one of the collimator lenses.

23. The method according to claim 22, wherein the first microlens elements and the second microlens elements each include a lens diameter and an optical axis, and the single mode optical fibers each include a core axis, said optically coupling each of a plurality of single mode optical fibers includes:
   aligning the optical axis of each first microlens element and the optical axis of the associated second microlens element with the core axis of the associated single mode optical fiber.

24. The method according to claim 22, wherein the first microlens elements and the second microlens elements each include a lens diameter and an optical axis, said optically coupling each of a plurality of single mode optical fibers includes:
   inclining the core axis of each single mode optical fiber relative to the optical axes of the associated first and second microlens elements.

25. The method according to claim 22, wherein the first microlens elements and the second microlens elements each include a lens diameter and an optical axis, said optically coupling each of a plurality of single mode optical fibers includes:
   among the associated first and second microlens elements, aligning the core axis of each single mode optical fiber with the optical axis of the microlens element that is located closer to the distal end of the single mode optical fiber.

* * * * *